United States Patent [19]

Jimenez

[11] Patent Number: 4,894,944
[45] Date of Patent: Jan. 23, 1990

[54] SNAP RING CONNECTOR

[76] Inventor: Eustilio Jimenez, 926 Aqua Tiba, Chula Vista, Calif. 92011

[21] Appl. No.: 247,406

[22] Filed: Sep. 21, 1988

[51] Int. Cl.$^4$ .................. A01K 75/00; A44B 21/00
[52] U.S. Cl. .................................. 43/7; 24/239
[58] Field of Search .................. 43/7; 59/85, 86; 24/294, 16 R, 231, 239, 241 SC, 242

[56] References Cited

U.S. PATENT DOCUMENTS 2,989,862 6/1961 Segal .................................... 24/239
4,654,937 4/1987 Brown .................................. 24/239

Primary Examiner—M. Jordan
Attorney, Agent, or Firm—Brown, Martin, Haller & McClain

[57] ABSTRACT

An apparatus having a curved member in a substantially closed configuration so as to define an ovate shaped confinement area wherein the curved member is formed from a material having a first hardness. A cross piece is connected to the curved member within the confinement area. A snap release mechanism disposed upon the curved member is movable between a first position for opening the configuration and a second position for closing the configuration. The curved member has a line engaging surface facing the confinement area having a material deposit thereon. The material deposit has a second hardness relatively greater than the first hardness.

9 Claims, 2 Drawing Sheets 4,894,944

SNAP RING CONNECTOR

BACKGROUND OF THE INVENTION

I. Field of the Invention

The present invention relates to fishing devices. More specifically, the present invention relates to a novel and improved snap ring fishing net connector.

II. Description of Related Art

In the fishing industry, various types of line connectors are used for assembling seines used in the harvesting of fish. Among the many types of connectors, snap ring connectors are commonly used for making connections between the fish net (the seine) and the draw cable. These snap ring connectors are generally curved, ring-shaped members made of heavy metallic material. When a snap ring connector is used to connect two or more lines, a stationary line is attached to one end of the connector for connection with the net, while the remaining line(s) are run through the opening of the connector to slidably engage the snap ring connector along its inner surface.

In a typical fish harvesting application, a number of snap ring connectors are individually tied to the perimeter of the seine. A tow line (draw cable) goes through the center opening of each of the connectors and is used by for towing the fish net. Concurrent with the release of this main line, the fish net is dropped into the water from a fishing vessel to allow it to spread over a wide area of water upon the target school of fish. Under its own weight and the weight of the attached connectors, the net slowly descends in the water and the harvesting of the fish begins.

Upon achieving a suitable depth where fish are expected to be present, the fishermen begin to draw the tow line by pulling in its two ends. With this action, the snap rings along the perimeter of the fish net slide along the main line and are drawn close in with each other thereby causing the net to close and to contain the fish.

Previously used fish net line connectors are shown in FIGS. 1 and 2. These connectors are commonly made of steel material. Some are zinc-coated to enhance their corrosion resistance.

FIG. 1 shows a line connector consisting of a generally O-ring member for line engagement. Connection with the net is made with a stationary line tied to one portion of the ring. The draw cable, which is used for the closing of the net opening, is seen threading through the ring. A cross bar extends across the O-ring to separate the two lines which are to be engaged.

FIG. 2 shows a snap ring connector represented by a continuously curved member having a pear shape with a curved small upper portion, a relatively longer curved lower portion and two relatively straight side portions connecting the upper and lower portions. The stationary line, which is used to attach the ring to the fish net, is shown tied to the smaller upper portion of the ring. A draw cable, for towing or closing the net, is shown engaged along the inner circumference of the ring. This draw cable is allowed to slide along the line engaging surface of the ring's inner circumference.

The snap ring connector of FIG. 2 also shows a spring-loaded trap door on a straight side portion of the ring for opening and closing so as to facilitate the engagement of the draw cable without having to thread it in order through each of the connectors. The trap door is opened to allow the draw cable to be engaged by the connector. Contained within this spring-loaded trap door is a spring for releasably closing the trap door after the draw cable has been placed into the snap ring.

Similar to the O-ring shaped line connector as shown in FIG. 1, the snap connector has a cross bar which extends across the opening of the ring to create two spaces for separating the stationary line from the draw cable to reduce the possibility of line tangling. One of these spaces lies between the cross bar and the smaller curved portion, the other between the longer curved portion and the cross bar.

A major problem encountered in the use of these prior art line connectors is that they are highly susceptible to wear along the inner surface of the rings where contact is made between the draw cable and the connector. The draw cable is typically of braided steel construction; and prior art connectors are fabricated from steel stock or pipe and have smooth rounded surfaces. Thus, even though that they may be zinc coated for increased corrosion resistance, they are not capable of withstanding the abrasions generated by the draw cable when it is engaged upon the inner surface of the rings. This results in an average useful life time of six months for such prior art ring connectors. Frequent replacements of these rings are thus required resulting in high repair or equipment costs for seine fishing rings. In addition, the materials used in the manufacture of the snap ring connector make it vulnerable to corrosion, particularly after prolonged periods of immersion in seawater. This problem necessitates periodic fresh water cleaning of the snap ring connectors which is both inconvenient and costly, particularly on long fishing expeditions where fresh water is always a scarce commodity.

SUMMARY OF THE INVENTION

It is the object of the present invention to provide a snap ring connector with increased resistance to wear and corrosion. According to the present invention, a snap ring connector is provided to comprise a curved pear-shaped member having an improved wear-resistant surface along the inside portion of its circumference where it engages the draw cable, and an spring-loaded trap door for the opening or closing of the snap ring connector for the placement of the draw cable.

In a preferred embodiment of the invention, the snap ring connector basically comprises a ovate shaped member made of stainless material to reduce the corrosive effects of sea water on the snap ring, a surface material deposited along the inner surface of the connector to provide a suitable hardened surface of contact between the draw cable and the connector, and a crossbar extending from one side of the connector to provide separate line engagement spaces for the stationary line and the tow line, and a spring-loaded trap door. The spring-loaded trap door is made of two piece construction having interfitting threads for connecting each other and with suitable inner diameter to accommodate the diameter of the ring connector.

BRIEF DESCRIPTION OF THE DRAWINGS

These and other features, objects and advantages of the present invention will become more apparent from the detailed description set forth below, when taken in conjunction with the drawings in which like reference characters correspond throughout and wherein.

DETAILED DESCRIPTION OF THE INVENTION

Figure 1:
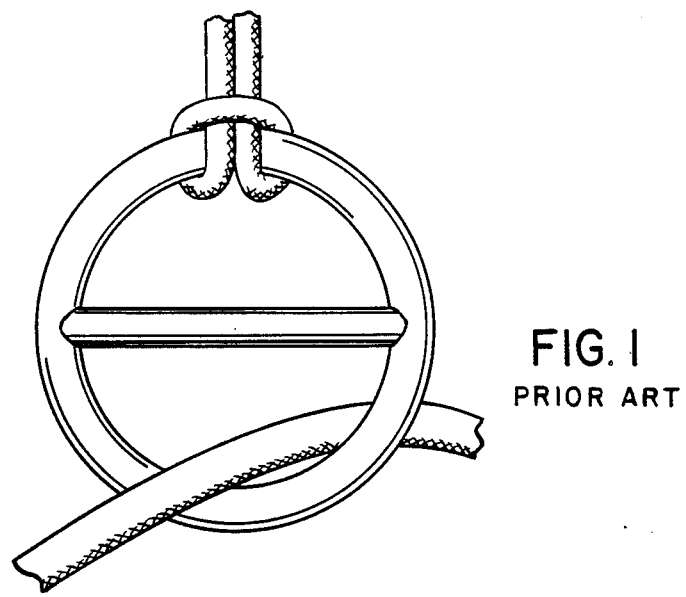
FIG. 1 is a front elevation view of a prior art O-ring.
Figure 2:
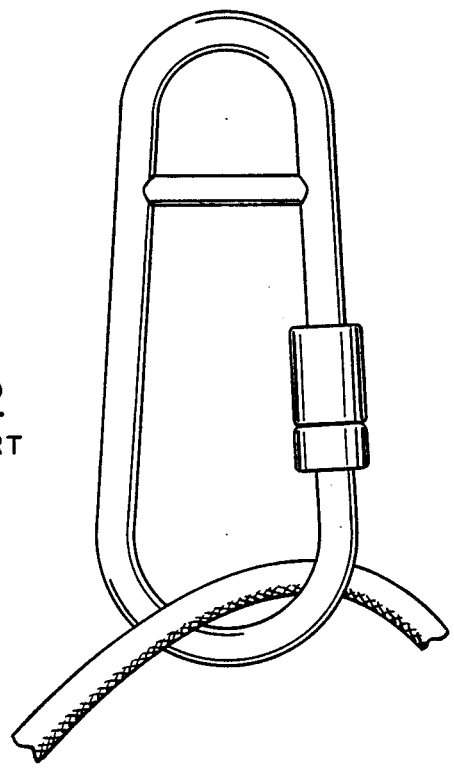
FIG. 2 is a front elevation view of a prior art ovate snap ring connector.
Figure 3:
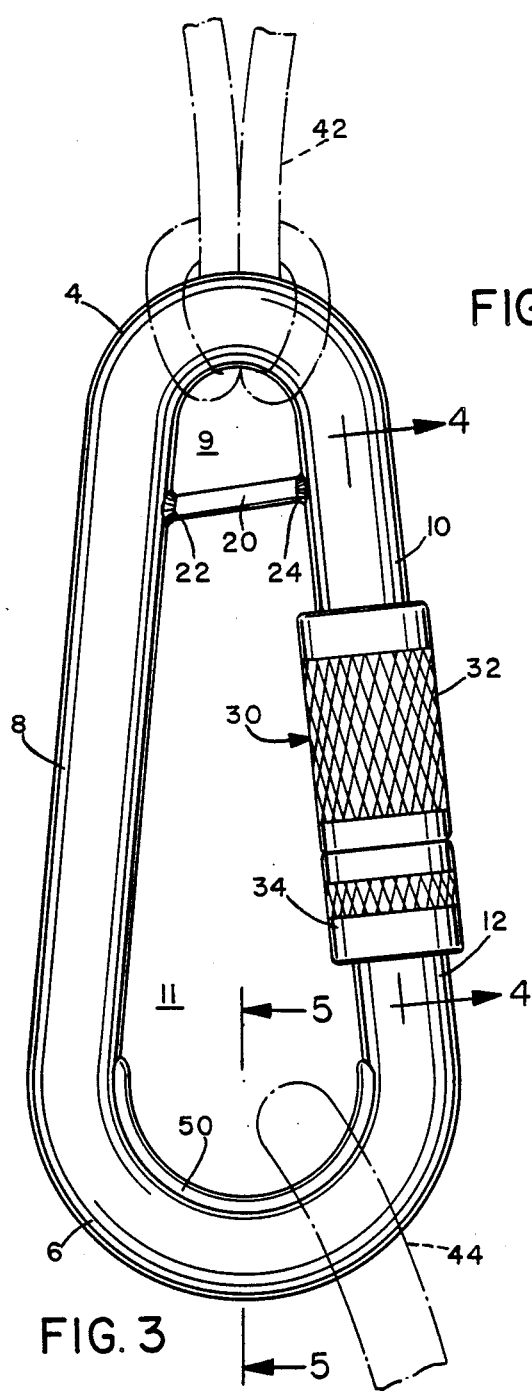
FIG. 3 is a front elevation view of the snap ring connector of the present invention.
Figure 4:
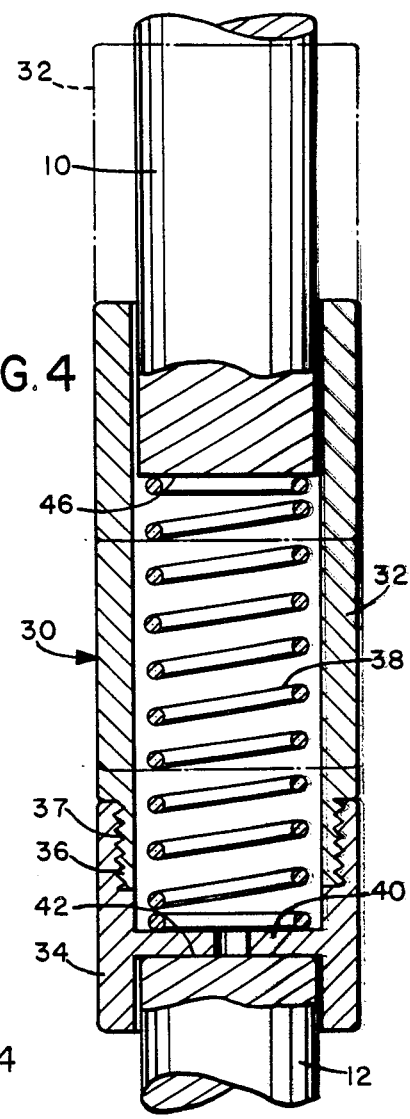
FIG. 4 is an enlarged sectional view taken on line 4—4 of FIG. 3.
Figure 5:
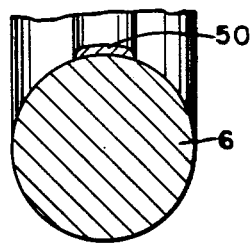
FIG. 5 is an enlarged sectional view taken on line 5—5 of FIG. 3.

FIGS. 3, 4 and 5 of the accompanying drawings show a preferred embodiment according to the invention. In FIG. 3 the ovate shaped connector of the present invention is shown having an upper arcuate portion 4 and a lower arcuate portion 6 connected by an extension member 8.

The upper arcuate portion has a relatively smaller radius and length than the lower arcuate portion. For example, in one preferred embodiment of the invention, the upper and lower arcuate members have an inner radii of approximately ¾" and 2½" respectively. Of course, the radii and the arcuate lengths of both portions can be suitably varied so as to accommodate the size of the lines to be engaged or connected. The arcuate members are connected by extension member 8 forming a C-shaped configuration. The combined configuration can be made by round welding the pieces together, or it can be fabricated from steel stock by cold bending. A suitable length of this member can be in the order of 25". The material used for the fabrication of this C-shaped configuration is preferably stainless steel, for example 1¼" diameter #T-304L stainless steel, or any other materials which possess good structural strength and exhibit corrosion resistant characteristics when subject to salinity.

A cross bar 20 extends from point 22 along extension piece 8 across the snap ring connector in a slightly upwardly direction and is welded to point 24 of the connector to define two confinement areas 9 and 11 within the connector. The main purpose of this cross bar is to provide separate spaces for the lines so as to minimize the possibility of line entanglement in fishing operations. The upward orientation for cross bar 20 is to permit a greater travel for the trap door mechanism 30 to result in a larger opening for the C-configuration to accept draw cables with larger diameter size.

A stationary line 42 is connected to the upper portion of the connector. The connection can be made with any convention means. Draw cable or line 44 threads through area 11. In fishing operations this draw cable is intended to engage upon hardened surface 50 formed upon the inner surface of lower arcuate portion 6 of the connector (FIG. 5). Hardened surface 50 consists of a material deposit having a physical property capable of withstanding the abrasive effect of the line when it is drawn or pulled. In a preferred embodiment of this invention, this material is composed of preferably a 5/32" chrome-manganese welding rod welded at a welder setting of 300 volts/120 amperes, upon the inner line-engaging surface of lower arcuate portion 6 of the connector. Although chrome-manganese material is preferred, other types of materials may be utilized to form the hardening of the inner surface.

Line 44 is placed into the larger confinement area either by inserting its open end through confinement areas 11 of the connector; or by passing it through the trap door mechanism 30.

Referring to FIG. 4, trap door mechanism 30 comprises a cylindrical member members 32 and 34 and spring 38, disposed between the respective elongated portions 10 and 12 of the upper and lower arcuate portions 4 and 6. In this preferred embodiment of the invention, the material used for the cylindrical member is stainless steel, typically #T-304 stainless steel pipe, or other material having corrosion resistant characteristics. Furthermore, it is preferred that spring 38 be formed of stainless steel #302 wire having a ⅛" diameter. The trap door mechanism slidably engages within its inner diameter the elongated portions 10 and 12 for opening and closing of the larger confinement area so as to facilitate the placement of the draw cable. FIGS. 3 and 4 illustrate trap door mechanism 30 in the closed position which is effected by a spring 38 located within trap door mechanism 30 to resist against its opening.

Spring 38 is a helical compression spring located within cylindrical members 32 and 34 to act against end surface 46 of elongated portion 10 of upper arcuate portion 4 and spring stop 40 located at the lower portion of trap door mechanism 30. Acting against the elongated portion, spring 38 urges spring stop 40 toward the lower elongated portion 12 of lower arcuate portion 6, thereby closing the larger confinement area 11 of the snap connector.

When trap door mechanism 30 is slid towards the upper arcuate portion 10, trap door mechanism 30 opens the confinement area 11. The opening of confinement area 11 enables the placement of the draw cable into the confinement area 11 for line engagement.

In the present embodiment of the invention, trap door mechanism 30 consists of two hollow cylindrical members 32 and 34 having interfitting male and female threads for connecting with each other. However, cylindrical members 32 and 34 may be integrally formed and positioned upon elongated portion 10 during the bending of upper accurate portion 10. Disposed within the interior of mated cylindrical members 32 and 34 is spring 38. Cylindrical member 34 contains spring stop 40 affixed within its inner diameter at a distance from end opposite engagement with cylindrical member 32, to securably engage the end surface 42 of elongated portion 12 of lower arcuate portion 6. It is also preferred that spring stop 42 be formed from stainless steel, such as a stainless steel washer welded to the interior of cylindrical member 34. To install the trap door mechanism onto the elongated portions, the two cylindrical members 32 and 34 are first disconnected and the spring removed. The upper member 32 is then slid onto the elongated portion 46 toward upper arcuate portion 4. Next, spring 38 is inserted into the inner diameter of cylindrical member 32. The relative lengths of cylindrical member 32 and spring 38 are such that when cylindrical member 32 is slid toward the upper arcuate portion, part of the spring will be exposed. This exposed portion of the spring is engaged in compression by cylindrical member 34 which allows cylindrical member 34 to clear into the space between the elongated portions of upper and lower arcuate members 4 and 6. The spring then is held compressed until interfitting male and female threads 36 and 37 come into contact with each other for connecting cylindrical members 32 and 34. Thereafter, the unitary trap door mechanism is released to allow the compression spring to close. To enhance handling, the exterior surface of the trap door mechanism is roughened, or knurled to enable a firmer grip by the fish net operator.

Although the preferred embodiment of the present invention is constructed primarily of stainless steel, is envisioned that other types of non-corrosive, high-strength resilient materials may be utilized. Stainless steel is a preferred material due to its inherent ability to withstand corrosion from salt and other corrosive agents. It is further envisioned that materials such as hot-rolled steel may be utilized to form the snap ring connector of the present invention. If such materials as hot-rolled steel is used, it is preferred that the snap ring connector be plated or galvanized to reduce corrosion due to moisture and salt.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not included to be limited to the embodiment shown herein, but is to be accorded the widest scope consistent with the principles and novel features disclosed herein.

I claim:

1. A snap ring connector for releasably connecting a pair of lines, comprising:
   a curved member in a substantially closed configuration in defining an ovate shaped confinement area, said curved member being formed from a material having a first hardness;
   a cross piece connected to said curved member within said ovate shaped confinement area;
   a snap release mechanism, movable in said member to a first position opening said configuration, and to a second position closing said configuration;
   a line-engaging surface on said curved member, said line-engaging surface facing said confinement area; and
   a material deposit on said line-engaging surface, said material deposit, having a second hardness relatively greater than said first hardness.

2. The snap ring of claim 1, wherein the snap release mechanism comprises a roughened gripping surface on said snap release mechanism.

3. The snap ring of claim 1, wherein the snap ring mechanism comprises a tubular member;
   a retaining member within said tubular member; and
   a coil springs positioned within said tubular member between said retaining member and one end of said curved member.

4. The snap ring connector of claim 1 wherein the material of the snap ring is stainless steel.

5. The snap ring is described in claim 1, wherein the material of the deposit is chrome-manganese welding rod.

6. In a line-connecting snap ring including a curved member defining and enclosing a pear shaped confinement area and having a line-engaging surface facing set confinement area, the improvement comprising:
   a material deposit of said line engaging surface including chrome-manganese welding material; and
   a snap-release mechanism, movable in said member to a first position opening said configuration and to second position enclosing said configuration, said snap-release mechanism including a roughened gripping surface.

7. The snap ring of claim 6 wherein said curved member comprises of stainless steel rod stock material.

8. The snap ring of claim 6 wherein said welding material is 5/32 inch welding rod deposited onto said line engaging surface through an electrical charge of 300 volt and current of 120 amperes.

9. The snap ring of claim 6 wherein said snap-release mechanism comprises a tubular member;
   a retainer member within said tubular member; and
   a coil spring position within said tubular member between said retaining member and one end of said curved member.

* * * * *